Nov. 19, 1968 L. MOORE 3,411,933
METHOD FOR COATING PIPE
Original Filed May 10, 1963 5 Sheets-Sheet 3

INVENTOR.
LOUIS MOORE
BY E. J. Berry

Nov. 19, 1968 L. MOORE 3,411,933
METHOD FOR COATING PIPE
Original Filed May 10, 1963 5 Sheets-Sheet 4
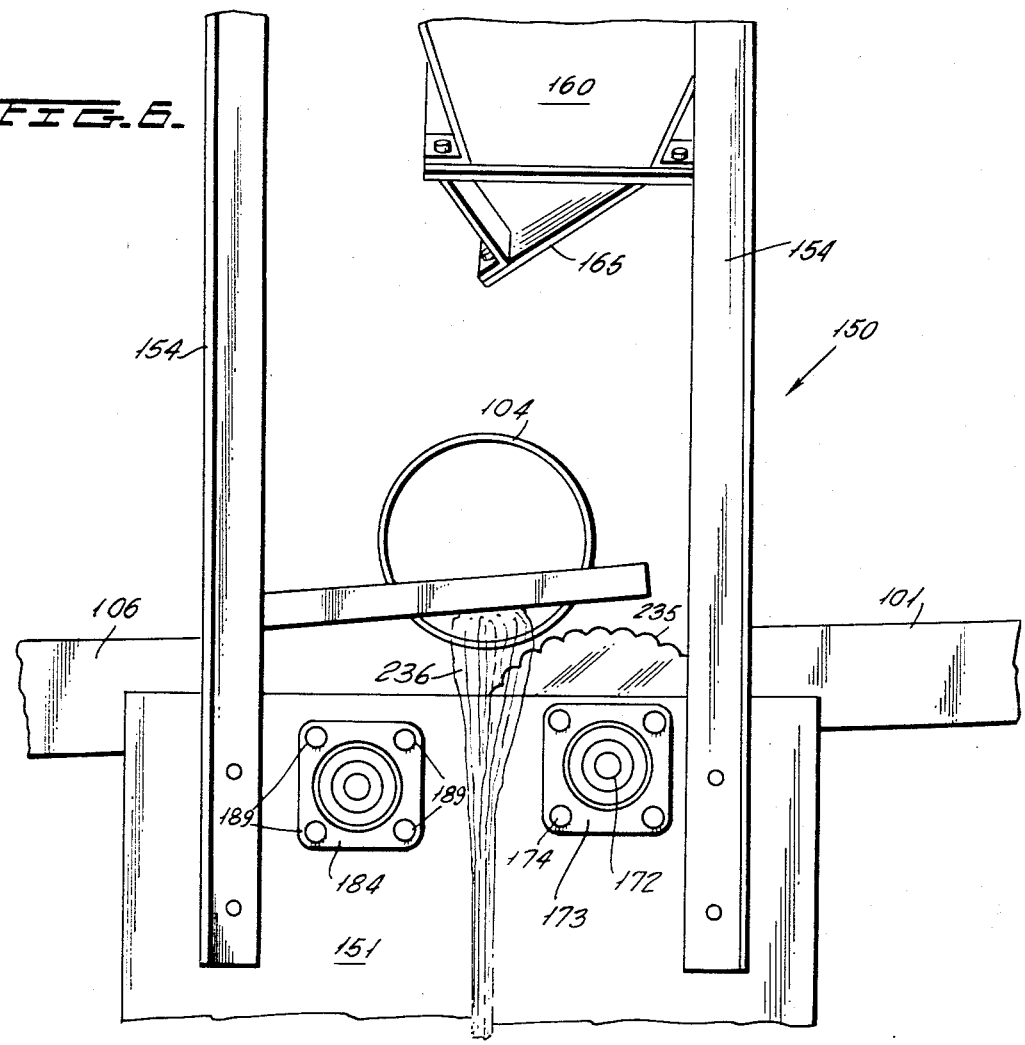
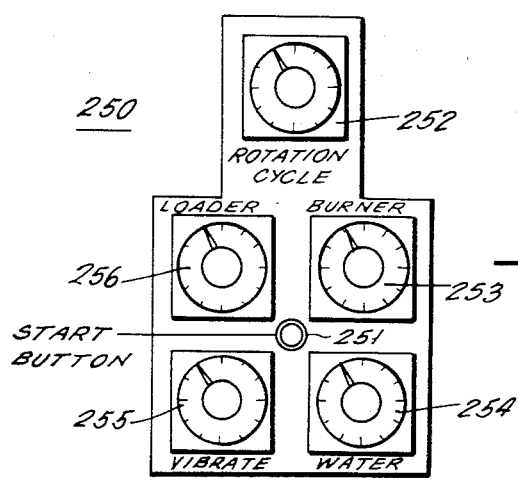
INVENTOR.
LOUIS MOORE
BY E. J. Berry

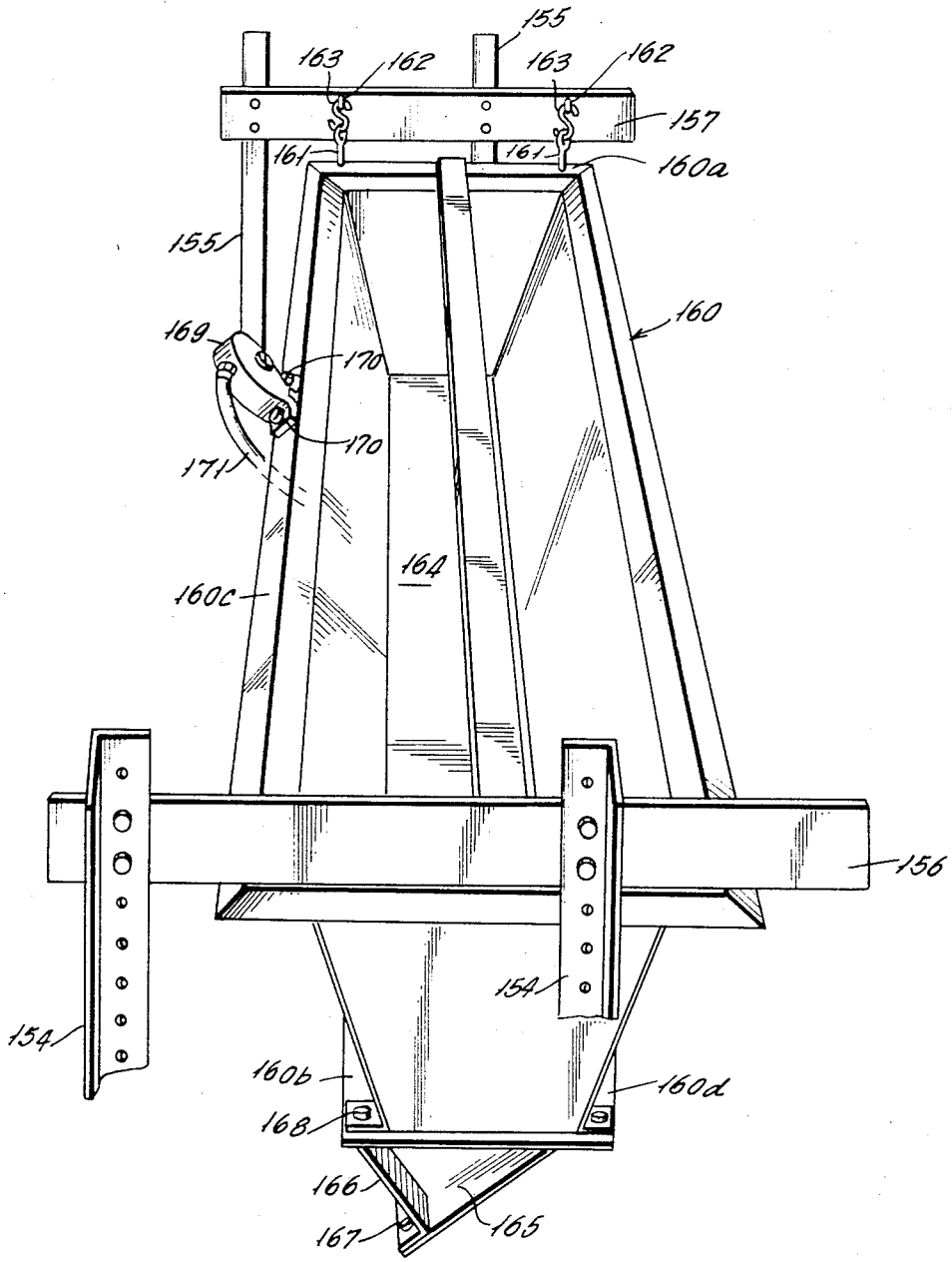

United States Patent Office 3,411,933
Patented Nov. 19, 1968

3,411,933
METHOD FOR COATING PIPE
Louis Moore, Birmingham, Ala., assignor to National Distillers and Chemical Corporation, New York, N.Y., a corporation of Virginia
Continuation of application Ser. No. 279,533, May 10, 1963. This application Mar. 30, 1967, Ser. No. 627,268
5 Claims. (Cl. 117—18)

ABSTRACT OF THE DISCLOSURE

A method for coating pipe in which the pipe is rotated about its longitudinal axis while experiencing no linear motion; is heated over its entire length while rotating so as to be raised to a predetermined temperature level; is then coated by a particular material dropped by gravity from a position above the rotating heated pipe; and then is cooled by introducing a coolant into one end of the pipe which is slightly tilted causing the coolant to be removed at the opposite lower end of the pipe to cool first the pipe and then the coating.

---

This application is a continuation of application Serial No. 279,533, filed May 10, 1963, now abandoned.

The instant invention relates to pipe coatings, and more particularly to a novel method for coating pipe sections and the like with a protective polyethylene material which prevents damage to the pipe from any corrosive source.

Present day oil and gas systems employ long pipe lines for the transportation of oil, gas and the other fluids from one remote location to another. Such pipe lines are frequently installed along, or in, the ground, and such pipe lines may extend for hundreds of miles. In many such installations, the pipe line makes direct physical contact with earth which contains elements having highly corrosive properties. Therefore it becomes necessary to provide protective coatings for each section of pipe in order to prevent corrosion which ultimately will lead to necessity of replacement of severely corroded sections. Many protective coatings presently in use are applied to the pipe sections in the field, thereby requiring transportation of the coating materials to the field and additional manpower for application of the protective coatings to the pipe sections. Such present day methods thereby have been found to be extremely expensive and their wide-spread usage thereby becomes economically prohibitive.

The instant invention deals with a method for coating pipe with a protective polyethylene layer so that coated pipe sections may be transported to the field for installation without the necessity for performing the additional step of applying the protective coatings in the field. Pipe sections coated in accordance with the principles of the instant invention adhere rigidly to the pipe section, and may be of any desired thickness depending only upon the needs of the user. The polyethylene material employed exhibits superior protective characteristics so as to guarantee extremely long, useful operating lives for pipe sections coated in the manner described in the instant invention.

The method of the instant invention is comprised of the steps of heating the pipe sections to be treated to a temperature in the range of 500° to 600° F. A powdered polyethylene material is then sprinkled over substantially the entire length of the pipe section. Simultaneously with the sprinkling action, the pipe section is rotated about its own longitudinal axis to insure spreading of the powdered polyethylene material over its entire outer cylindrical surface. The fineness of the powdered polyethylene material is chosen so as to pass through a screen of approximately 40 mesh. After a predetermined period of time, the sprinkling operation is terminated, but the rotation of the pipe section being treated is continued. After a predetermined time period beginning with the termination of the sprinkling operation, water at ambient temperature is fed into one end of the rotating pipe section which is tilted so that the end of the pipe section opposite the end in which the water is being fed is at a somewhat lower level so that the water will feed by gravity through the rotating pipe section in order to flow out of the lower end of the pipe. The water continues to enter the high side of the pipe section being treated until the powdered polyethylene sprinkled upon the pipe section has its temperature level fall below the softening point of the powdered polyethylene. The softening point is in the range of 100 to 180° F., depending upon the type of powdered polyethylene employed. The fineness of the powdered polyethylene employed in the coating operation is chosen so that it begins to fuse substantially instantaneously to the outer surface of the pipe section as soon as it makes physical contact with the pipe surface. The elapsed time period between the termination of the sprinkling operation and the initiation of the cooling operation is of a sufficient time period to permit the fusing powdered polyethylene to be "smoothed out" on the surface of the pipe section. The rotating pipe section may further be vibrated during the rotation thereof in order to enhance the smoothing-out operation.

Pipe sections which may be treated by the method of the instant invention may be formed of steel, cast iron, or any other suitable metal. The inherent characteristics of the metallic pipe and the powdered polyethylene are such that the coefficient of expansion of the polyethylene is approximately twenty times greater than the coefficient of expansion of the metallic pipe. With the cooling operation utilized in the coating method of the instant invention, the metallic pipe is cooled first so that it undergoes contraction prior to the contraction of the fused polyethylene material. The lowered temperature of the metallic pipe is then radiated to the fused polyethylene so that the polyethylene material undergoes contraction. Since the coefficient of expansion of the polyethylene material is approximately twenty times greater than that of the metallic pipe, the polyethylene material undergoes a substantially high degree of contraction or shrinkage so that it forms an extremely tightly bound skin or layer around the outer surface of the pipe section, thereby completely preventing its removal from the pipe section. The characteristics of the polyethylene are such that the coating will not crack, either during or after the contraction of the polyethylene, since the elongation characteristics of the polyethylene material is approximately 600%.

Upon completion of the cooling operation, there is no necessity for curing or storing the treated pipe section, and it is thereby immediately available for installation in the field. The method of the instant invention further requires no preparatory steps whatsoever other than the actual method steps of the process. Many prior are coating methods require preparatory steps such as sandblasting of the pipe sections, application of primers to the pipe sections, and so forth. Thus, the method of the instant invention, in addition to providing a pipe coating of excellent protective characteristics, further provides a method which is extremely simple and highly economical to use, and thus produces coated pipe sections having an extremely long useful operating life.

A structural embodiment which may be employed carrying out the method of the instant invention is comprised of a guide rail structure which rollingly supports a plurality of pipe sections to be treated at the extreme ends of the pipe sections. The guide rail structure is slightly elevated at a first end thereof so as to permit the pipe section supported by the guide rail means to be fed by gravity towards the pipe coating apparatus.

The pipe coating apparatus is comprised of motor operated roller means which continuously rotate at a predetermined angular velocity. Second roller means are positioned adjacent the motor operated roller means for co-operation with the motor operated roller means in order to permit a pipe section to be rotated about its longitudinal axis, while experiencing no translational movement. A hopper is positioned above the rotating pipe section, and is provided with a deflection plate having its lower marginal edge positioned substantially above the rotating pipe section. Vibration means are positioned and secured to the hopper means for the purpose of imparting vibratory movement to the hopper means. The hopper means base portion is provided with a screen of a predetermined mesh through which the powdered polyethylene material is sifted as the hopper is vibrated. The polyethylene material which sifts through the screen falls upon the gently sloping deflection plate affixed to the base portion of the hopper and positioned substantially beneath the hopper mesh screen. The polyethylene material slides downwardly upon the deflection plate and upon reaching the lower marginal edge of the deflection plate falls by gravity upon the surface of the rotating pipe section.

In order that the powdered polyethylene material be enabled to fuse substantially instantaneously upon making physical contact with the pipe section being treated, suitable heating means are provided to heat the pipe section to a temperature level in the range of 500° to 600° F.

The heating means provided is positioned immediately beneath the rotating pipe section, and is designed to heat the rotating pipe section along its entire length so as to raise the temperature of the pipe section to a temperature level in the range of 500° to 600° F. This operation is carried out prior to initiation of the vibrator means. When the rotating pipe section is raised to the desired temperature level, the vibrating means in actuated, causing the powdered polyethylene material to sift through the screen and be guided by the deflection plate upon the surface of the rotating pipe section. Since the rotating pipe section is raised to a temperature in the range of 500° to 600° F., the powdered polyethylene fuses instantaneously upon making physical contact with the surface of the rotating pipe so as to provide a smooth uniform protective coating upon the pipe surface.

The timing means for the vibrating means deactivates the vibrating means after a predetermined time period in order to terminate the sifting of the powdered polyethylene material through the hopper screen.

The timing means for the motor operated roller means remains activated for a predetermined time period after termination of the vibratory period so as to permit the powdered polyethylene to be "smoothed-out," thus providing an extremely even coating of uniform thickness over the entire outer surface of the pipe section. In order to further enhance the "smoothing-out" operation, vibratory motion may be imparted to the rotating pipe, causing a more rapid smoothing-out or spreading of the fusing polyethylene material.

After a sufficient elapsed time period, suitable cooling means is activated for the purpose of cooling both the pipe and the protective coating provided thereon. The cooling means receives a coolant, such as, for example, water at substantially ambient or room temperature into the interior of the pipe section so that it makes physical contact with the interior surface thereof. The rotation of the pipe section is maintained during the cooling operation in order to insure that the water will make physical contact with the entire inner surface of the pipe section as it completes each revolution. The cooling operation is sustained for a period sufficient to lower the temperature level of the polyethylene coating below its softening point, which in one experimental run was known to be of the order of 140° F.

By introducing the coolant into the interior of the pipe section being treated, this insures that the pipe will first be cooled and will subsequently radiate its diminished temperature level to the polyethylene coating after the metallic pipe has undergone substantially all of its contraction due to cooling. Upon completion of the cooling operation, the temperature of both the pipe and the pipe coating is lowered sufficiently such that it can be immediately handled without the necessity for any subsequent cooling period. Upon completion of the cooling operation, no additional steps, such as, for example, curing, aging, etc., are needed enabling each coated pipe section to be immediately available for field installation. The pipe coating apparatus is designed to coat pipe of any diameter from as small as 4 inches diameter to as large as 60 inches and above diameters, for example, these ranges being cited as merely exemplary and not as limitations upon the pipe coating apparatus.

Each timing means employed in the coating apparatus is adjustable so as to control the length of the vibration period for the hopper, the length of the rotation period of the pipe section being coated, and the length of the cooling operation. The heating means may also be adjusted to any desired temperature level. The time period adjustments and the temperature level adjustment of the heating means are sufficiently flexible to permit pipe sections to be coated with layers in the range of from 10 to 125 mils thickness. Pipe sections coated in accordance with the method of the instant invention have been placed under salt crock tests for periods of over twelve weeks and have shown no signs of deterioration whatsoever.

It is therefore one object of the instant invention to provide a novel method for coating pipe sections and the like with a protective film.

Still another object of the instant invention is to provide a novel method for coating pipe sections and the like with a polyethylene material which exhibits excellent protective characteristics to prevent the pipe sections from experiencing any corrosion whatsoever.

Still another object of the instant invention is to provide a novel method for coating pipe sections and the like which is comprised of the steps of applying powdered polyethylene material to the pipe surface of a pipe section which has been heated to a predetermined temperature level sufficient to fuse the powdered polyethylene upon the pipe surface.

Another object of the instant invention is to provide a novel method for coating pipe sections and the like which is comprised of the steps of applying a powdered polyethylene material to the outer surface of a preheated pipe section while the pipe section is being rotated about its longitudinal axis.

Still another object of the instant invention is to provide a novel method for coating pipe sections and the like which is comprised of the steps of applying a powdered polyethylene material to the outer surface of a preheated pipe section and cooling the pipe section from the interior surface of the pipe to a temperature level sufficient to drop the fused polyethylene material below its softening point.

Still another object of the instant invention is to provide novel apparatus for coating pipe sections and the like comprised of means for applying the powdered polyethylene material to the surface of the pipes, means for rotating the pipe sections being treated, means for preheating the pipe section prior to the application of the powdered polyethylene material, and means for cooling the treated pipe section from its interior surface to drop the temperature of the fused polyethylene material below its softening point.

Still another object of the instant invention is to provide novel apparatus for the coating of pipe sections and the like which includes novel means for injecting treated pipe sections upon completion of the coating apparatus and simultaneously therewith for positioning the next pipe section to be so treated within the pipe treating apparatus.

These and other objects of the instant invention will become apparent when reading the accompanying description and drawings in which:

FIGURE 4 is a perspective view showing the control center housing the timing means for the pipe coating apparatus of FIGURES 1–3.

FIGURE 6 is a perspective view of the pipe coating apparatus of FIGURES 1–5 showing the water leaving the pipe section being treated during the cooling operation.

FIGURE 7 is a perspective view of the apparatus of FIGURE 1 looking down upon the hopper means.

Figure 1:
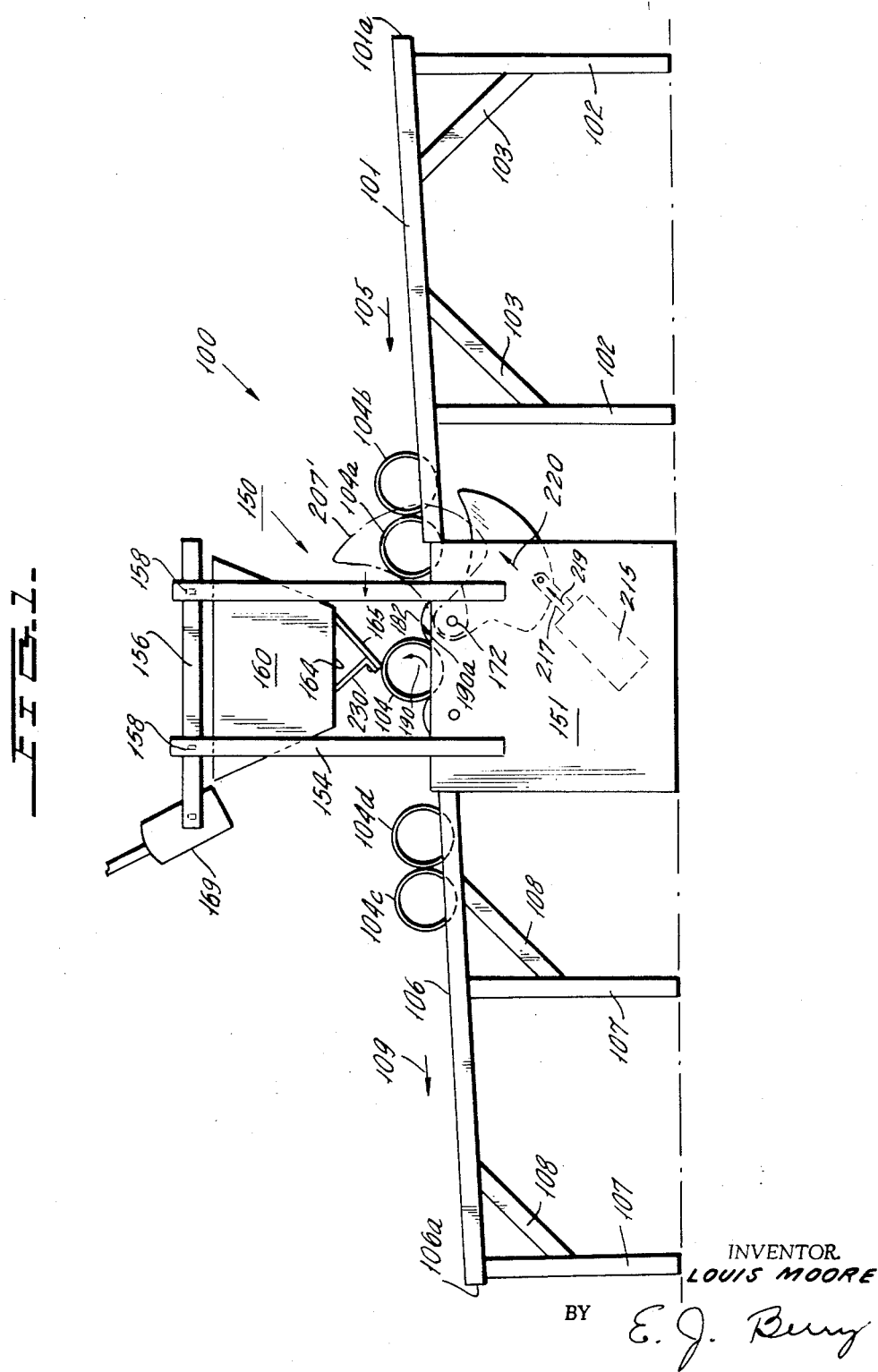
FIGURE 1 is a side elevational view of a pipe coating apparatus designed in accordance with the principles of the instant invention.

Referring now to the drawings, FIGURE 1 shows a pipe coating apparatus comprised of first and second guide rails 101 (only one of which can be seen in FIGURE 1) which are suitably supported by legs 102 and supporting braces 103. The left-hand end of the guide rails are positioned immediately adjacent the pipe coating apparatus 150 and the right-hand end 101a is elevated slightly above the left-hand end so as to permit the pipes, such as, for example, the pipes 104a and 104b to be fed by gravity in the direction shown by arrow 105 towards the pipe coating apparatus 150.

A second set of guide rails 106 (only one of which can be seen in FIGURE 1) are likewise supported by suitable legs 107 and supporting braces 108 in a manner similar to to the guide rails 101. The right-hand end of guide rails 106 are positioned immediately adjacent the pipe coating apparatus 150, while the left-hand end 106a is positioned slightly below the level of the right-hand end so as to enable the pipe, such as, for example, the pipes 104c and 104d to move in the direction shown by arrow 109 towards the lift-hand end of guide rails 106.

The pipe coating apparatus 150 is comprised of first and second substantially flat members 151 (see also FIGURE 2) which are suitably supported and secured by crossbar members 152 and 153. First and second substantially V-shaped angle arms 154 and 155 are suitably welded to respective supporting plates 151, and each pair of supporting angle arms 154 and 155 act to support a respective crossbar member 156 and 157 fastened to the vertical supporting members 154 and 155 at 158 and 159 respectively. A hopper 160 is suspended between the vertical supporting arms 154 and 155 by means of the eyelets, such as the eyelets 161 shown in FIGURE 7 which are secured to a suitable flange such as, for example, the flange 160a in FIGURE 7. The eyelets 161 are hung from a pair of similar eyelets 162 secured to the crossbar members such as, for example, the crossbar member 157 with the S-shaped members 163 having their opposing ends threaded through the eyelets 161 and 162 in the manner shown in FIGURE 7. The hopper 160 is hung in the manner described to facilitate vibratory movement of the hopper during the sifting operation in a manner to be more fully described.

The hopper 160 has a base 164, as can best be seen in FIGURE 7, which is a mesh screen of approximately 40 mesh. It should be understood that this mesh size is merely exemplary and the mesh size may be changed, depending upon the needs of the users. Extending downward from the lower right-hand edge of hopper 160 is a deflection plate 165 which is positioned substantially beneath the mesh screen 164 and has its lower marginal edge positioned above the pipe section 104 about to undergo the coating operation. The deflection plate 165 is secured along its upper marginal edge by suitable fastening means (not shown) to a flange 160d provided along the lower right-hand edge of hopper 160. The deflection plate 165 is further supported by brackets 166 secured by fastening means 167 to deflection plate 165 and by fastening means 168 to flange 160b provided along the lower left-hand edge of hopper 160.

A vibratory means 169 is secured to a flange 160c along the upper left-hand edge of hopper 160, as can best be seen in FIGURE 7, and is rigidly held there by fastening means 170. The vibratory means 169 is air operated and receives compressed air through a conduit 171 which connects the vibratory means 169 to a compressed air source (not shown) for vibration of the hopper 160, for a purpose to be more fully described.

A motor driven shaft 172 is journalled in bearings 173, only one of which can be seen in FIGURE 6. The bearings 173 are secured to the vertical plates, such as, for example, the vertical plate 151, by fastening means 174. The motor driven shaft 172 is rotated about its longitudinal axis by motor means 175, which can best be seen in FIGURE 5 and which is mounted to the vertical plate 151. Motor 175 drives a pulley 176 through a belt 177, coupling the motor output shaft to the pulley 176. Pulley 176 drives gear reducing means 178, which has its input shaft connected to pulley 176 and its output shaft coupled to motor driven shaft 172 by means of a chain drive 179. The gear reducing means 178 is of the adjustable type so that while the motor 175 is driven at constant r.p.m., the gear reducing means is adjustable to guide the motor driven shaft in the range of 17–22 r.p.m. It should be understood, however, that this range of angular velocity is merely exemplary and any other speed range desired may be employed, depending upon the needs of the user. The motor driven shaft 172 is provided with roller members 181 and 182, rigidly secured to shaft 172 at the opposite ends thereof, as can best be seen in FIGURES 1, 2 and 3, more particularly FIGURE 3. The rollers being rigidly secured to shaft 172 are employed to rotate the pipe section 104 being treated, such as, for example, the roller 182, shown in FIGURE 1, rotates in a counterclockwise direction, as shown by arrow 190a. This causes rotation of the pipe section 104 in the counterclockwise direction, as shown by arrow 190.

Figure 2:
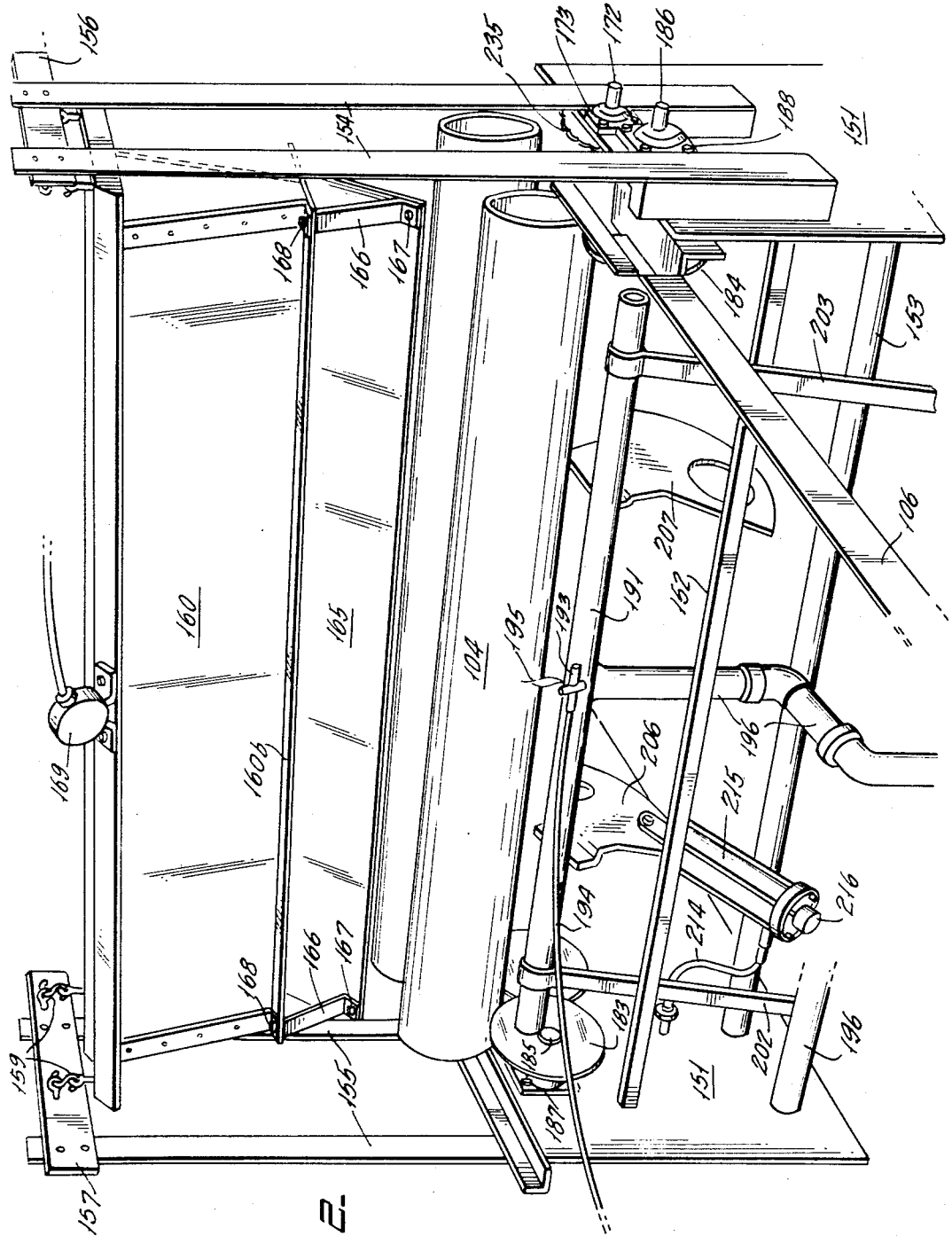
FIGURE 2 is a perspective view of the pipe coating apparatus of FIGURE 1, looking in the direction from the left-hand side of the apparatus of FIGURE 1.

A pair of free rotating roller members 183 and 184, which can best be seen in FIGURE 2, are rigidly secured to respective shafts 185 and 186, which are journalled within bearings, such as, for example, the bearing 188 secured to vertical plate 151 by fastening means 189, as can best be seen in FIGURE 6. The freely rotating rollers 183 and 184 cooperate with the motor driven rollers 181 and 182, respectively, to permit rotation of the pipe section 104 being treated about its own longitudinal axis, while at the same time maintaining the pipe section 104 in a position upon the roller pullers 181–183 and 182–184, in which position the pipe section 104 is maintained until completion of the pipe coating operation, in a manner to be more fully described.

Figure 3:
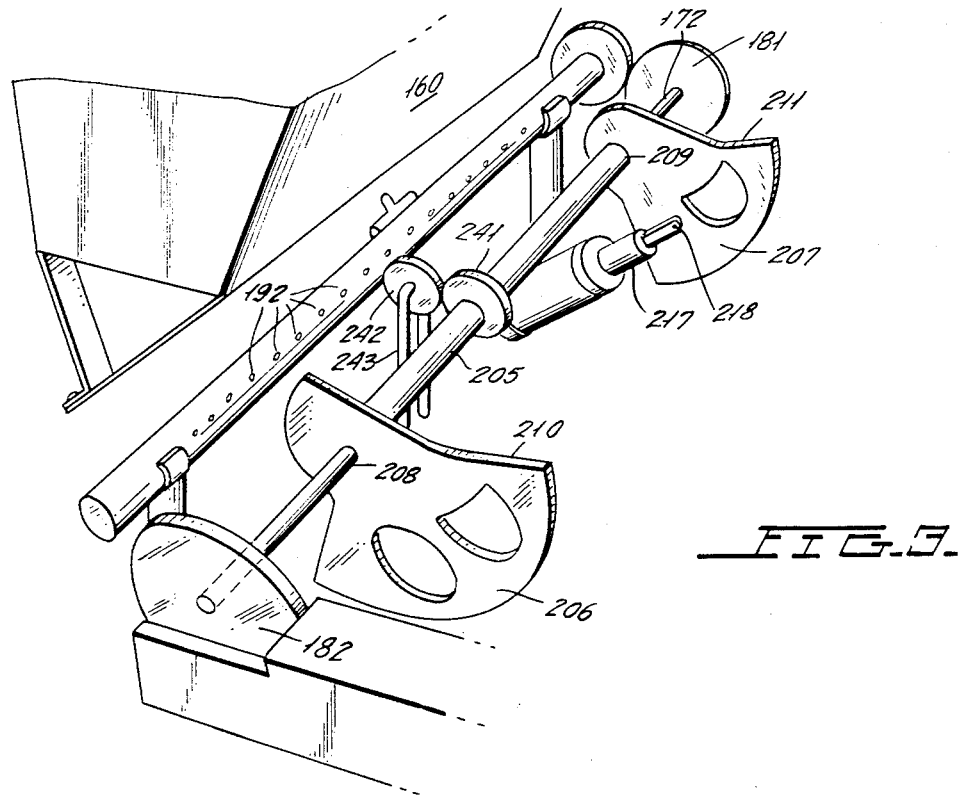
FIGURE 3 is a perspective view of the apparatus of FIGURE 1, looking from the right-hand side of FIGURE 1.

Considering FIGURE 2, the pipe coating apparatus is provided with a heating means comprised of an elongated tube 191 having a plurality of apertures 192 positioned at spaced intervals along the length of tube 191, as can best be seen in FIGURE 3. The apertures 192 are further angularly positioned along the surface of tube 191, such that they are directed towards and in close proximity to the pipe section 104 about to undergo the coating operation. A jet 193 is positioned intermediate the ends of tube 191 and is connected to a suitable source of an inflammatory mixture (not shown) by means of a conduit 194, in order to continuously maintain a pilot flame 195. The extreme ends of tube 191 are sealed in order to prevent the escape of inflammatory mixture fed to tube 191 through the extreme ends thereof. Tube 191 is also connected to the source of inflammatory mixture, such as, for example, a gas being fed under compression, by means of the lead-in pipe sections 196. The introduction of the inflammatory mixture into the tube 191 and out through the apertures 192 is controlled by the pipe coating apparatus control center, shown in FIGURE 4, in a manner to be more fully described.

Figure 5:
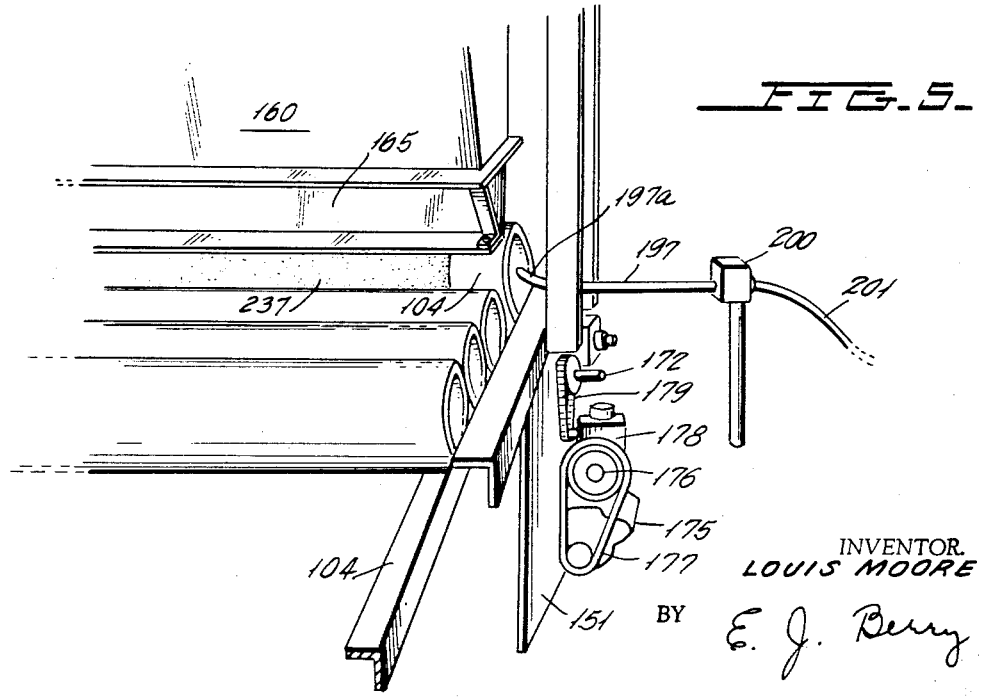
FIGURE 5 is a perspective view of the pipe coating apparatus of FIGURES 1–4 showing the water feed means employed in the cooling operation.

The cooling means of the instant invention is comprised of a conduit 197, as can best be seen in FIGURE 5, which has its output end 197a positioned in close proximity to the right-hand end of pipe section 104, in the view shown in FIGURE 5, and is connected to a suitable source of water under pressure (not shown) by a conduit 199. The flow of water through tube 197 is automatically controlled by an electrically operated valve 200 connected to the control center, shown in FIGURE 4, by conductor means 201, in order to control the initiation of the flow of water, the time period during which the water flows and the cut-off of the water flow, in order to carry out the cooling operation, in a manner to be more fully described.

The pipe loading means of the instant invention is designed to simultaneously position a new pipe section upon the roller pairs 181–183 and 182–4 and to eject the pipe section having completed the pipe coating operation. The loading means, which can best be seen in FIGURES 2 and 3, is comprised of a hollow tube 205 through which motor driven shaft 172 is threaded and further, such that the inner diameter of tube 205 is greater than the outer diameter of motor driven shaft 172 to permit rotation of motor driven shaft 172 without imparting any rotation whatsoever to tube 205. The first and second loading members 206 and 207 are provided with suitable apertures 208 and 209, respectively, which apertures are adapted to receive tube 205 into the extreme ends thereof. Loading members 206 and 207 are rigidly secured to tube 205. Each loading member 206 and 207 is provided with a substantially concave upper edge 210 and 211, respectively, each being adapted to be positioned immediately beneath the next pipe section, such as, for example, the pipe section 104a, shown in FIGURE 1, to be loaded upon the roller pairs 181–183 and 182–184 of the pipe coating apparatus 150. The loading operation is initiated by the control center of FIGURE 4 which is adapted to control the feed of compressed air through a conduit 214, shown in FIGURE 2, which connects a suitable source of compressed air to the hydraulic jack 215. The hydraulic jack 215 has its lower end 216 pivotally secured to the horizontally aligned pipe section 196 and has its upper end which is a compressed air driven piston 217 pivotally secured to loader member 207 at pivot point 218. When the compressed air source is connected to hydraulic jack 215 this causes piston 217 to telescope out of jack 215 in the direction shown by arrow 219. This substantially linear motion is imparted to loader member 207, causing it to rotate about motor driven shaft 172 in the direction shown by arrow 220. The rotation of loader member 207 is imparted to hollow tube 205 which is rigidly secured to loader member 207 and this rotational movement is directly imparted to loader member 206 also rigidly secured to tube 205. Therefore both loader members 206 and 207 rotate in the direction shown by arrow 220 until their concave upper edges 210 and 211 respectively rest against the lower portion of a pipe section, such as, for example, the pipe section 104a, shown in FIGURE 1. The piston 217 continues to move substantially in the direction shown by arrow 219 until loader members reach the position shown by the dotted outline 207' in FIGURE 1. This movement causes the pipe section 104a to move substantially in the direction shown by arrow 222 until it "bumps" against the right-hand edge of pipe section 104 causing it to roll over freely rotating rollers 183 and 184 and beyond these rollers 183 and 184 and upon the guide rails 106. Each subsequent loading action occurs in substantially the same manner. It should be noted, however, that no loading operation can occur unless and until a pipe section, such as, for example, a pipe section 104a, shown in FIGURE 1, is positioned immediately above the concave edges 210 and 211 of the loader members 206 and 207, respectively. This is due to the fact that it requires the pipe section being loaded beneath hopper 160 to "bump" the pipe section having undergone the coating operation from its position upon the roller pairs 181–183 and 182–184 to the guide rails 106. This is a safety feature, thereby preventing the initiation of a new pipe coating operation, unless and until a pipe section is properly positioned beneath hopper 160.

The operation of the pipe coating assembly 100 is as follows:

After suitably loading the pipe section, such as, for example, the pipe sections 104a and 104b upon the guide rails 101, as shown in FIGURE 1, in readiness for the pipe coating operation, the start button 251 provided in the control center 250, shown in FIGURE 4, is depressed. The control center 250 is also further provided with a plurality of timing means whereby the timing means 252 controls the length of the rotation cycle for the motor driven shaft 172. The timing means 253 controls the operation of the heating means. The timing means 254 controls the operation of the cooling means. The timing means 255 controls the operation of the hopper vibratory means and timing means 254 controls the actuation of the hydraulically operated loader means. It should be understood that all of these timers are suitably reset prior to depression of start button 251.

After start button 251 has been depressed, the cycle is begun by operation of the loader means hydraulic jack 251 to actuate the loader members 206 and 207 which loads the first pipe section upon roller pairs 181–183 and 182–184. For the sake of brevity, let it be assumed that since no pipe sections have yet been treated, the loader means simply loads the first pipe section, such as, for example, pipe section 104, shown in FIGURE 1, upon the cooperating roller members without ejecting any pipe section therefrom. It should be understood that the loader members can operate to load a pipe section upon the cooperating roller members even though an already treated pipe section may not be positioned upon the cooperating roller members. Immediately after loading of the pipe section 104 upon the cooperating roller members 181–183 and 182–184, the rotation cycle timer 252 becomes actuated so as to energize motor 175, shown in FIGURE 5, to cause rotation of the motor driven shaft 172. Motor driven shaft 172 rotates in the direction shown by arrow 190a causing pipe section 104 to rotate in the direction shown by arrow 190 of FIGURE 1. Immediately upon initiation of rotation of motor driven shaft 172 and hence pipe section 104, the burner timing means 253 is actuated, causing an inflammable mixture to be fed to tube 191, shown in FIGURE 2. The inflammable mixture escapes from the apertures 192 provided along tube 191. The escaping mixture is ignited by pilot flame 195 thus providing a plurality of jet like flames along the entire length of tube 191. All of these individual flames are directed towards and against the surface of the rotating pipe section 104 causing it to begin heating. As soon as the skin temperature of the rotating tube 104 reaches a predetermined temperature level, which in the exemplary embodiment lies within the range from 500° F.– 600° F. the burner timing and control means 253 causes energization of the vibratory timing means 255. The actuation of timing means 255 operates an automatic control valve (not shown) which permits the passage of compressed air through the conduit 171 shown in FIGURE 7 to the vibratory means 169. This causes vibratory means 169 to vibrate at a predetermined repetition rate which vibration is imparted to the hopper 160. Hopper 160 is free to vibrate due to the manner in which it is hung from cross-bars 156 and 157, by means of the S-shaped brackets 163 and the eyelets 161 and 162 respectively, which are provided at both ends of hopper 160.

The vibration of hopper 160 causes the powdered polyethylene material loaded into hopper 160 and upon the mesh screen 164 to sift through the screen 164 and down upon the deflection plate 165. Once passing through the mesh screen 164, the powdered polyethylene material slides along deflection plate 165 due to gravity and after reaching below the marginal edge of deflection plate 165 the powdered material falls upon the surface of the rotating pipe section 104. The powdered polyethylene material is of a fineness, such as to permit at least 75% of the material to pass through a 40 mesh screen and further, has the characteristics such that it fuses substantially instantaneously upon the surface of the rotating pipe 104, due to the temperature level (500° F.– 600° F.) existing at the skin of the pipe section 104. While a wide variety of polyethylene material may be utilized in this pipe coating operation, one preferable powdered polyethylene material identified by the trademark Microthene has been employed and has been found to have excellent characteristics which make it extremely suitable for use in the pipe coating operation described herein.

The relationship between the lower marginal edge of the deflection plate 165 and the rotating pipe section 104 being treated is such that the lower marginal edge of the deflection plate 165 is positioned to the right of the vertical phantom line 230 so that the powdered polyethylene material falling upon the surface of pipe section 104 is carried substantially in the upper direction due to the counterclockwise rotation of pipe section 104 about its longitudinal axis.

The vibratory means 169 continues its operation for a predetermined time period, depending upon the thickness of the polyethylene coating desired upon the surface of the pipe section 104. Two typical examples show that for a coating of a thickness of ten mils the vibration period is of five second duration and for a coating thickness of 40 mils the vibration period has a time duration of twelve seconds. These examples, however, should in no way be treated as being limited and any other vibration time periods may be used, depending upon the thickness of coating desired.

The vibratory means 169 is deactivated after a predetermined time period (depending upon the coating thickness desired) and the pipe section 104 continues rotation about its longitudinal axis for a period of approximately 90 seconds from the termination of the vibrating action. During this period the pipe continued rotation acts to "smooth out" the fused polyethylene material which is in physical contact with the outer surface of pipe section 104. In order to further enhance the smoothing operation, the pipe section 104 being treated may be simultaneously vibrated. One means for imparting such vibratory movement to pipe section 104 is comprised of providing motor driven roller means 181 and 182 with a scalloped peripheral edge, such as the scalloped edge 235 shown in FIGURE 6 of the drawing. This arrangement, in addition to imparting rotation to the pipe section 104 about its longitudinal axis also imparts a vibratory movement to the pipe section, acting to further enhance the "smoothing out" of the polyethylene material along the surface of pipe section 104.

After the time period of approximately 90 seconds duration the control center timing means 254 is actuated causing the valve 200 of FIGURE 5 to open, permitting water to flow through tube 197. The tube 197, as previously described, is positioned so as to permit water at approximately ambient temperature to enter through the opening of the pipe section 104 which is the high end of the pipe section so that the water in entering pipe section 104 will flow by gravity through pipe section 104 and out the opposite end as shown in FIGURE 6 wherein the water 236 flowing therethrough can be seen leaving the pipe section 104.

By feeding the coolant through the pipe section 104, the coolant comes into direct contact with the interior surface of pipe section 104, causing the cooling operation to begin at the inner surface of the pipe section. The rotation of pipe section 104 is continued during the time in which the coolant is entering the pipe section so that even though the water entering the pipe section 104 substantially comes into contact within the lower surface of the pipe section, the continuous rotation of the pipe causes the coolant to come into contact with the entire interior surface of the pipe section as it completes each revolution. The coolant continues to flow through the pipe section so that the cooling process which starts at the inner surface of the pipe section is radiated outwardly, first to the outer surface of the pipe section and then alternately to the fused polyethylene coating 237, which can best be seen in FIGURE 5. By performing the cooling operation in this manner, the pipe section 104, which has been expanded, due to the raising of the pipe to the temperature range of 500° F.–600° F., begins its contraction then substantially completes its contraction prior to the contraction of the polyethylene coating 237 shown in FIGURE 5. The substantially diminished temperature of the pipe section is then radiated to the polyethylene coating 237 in order to enable the coating 237 to begin contraction. Since the polyethylene material has a coefficient of expansion of approximately twenty times that of the pipe section, the polyethylene coating shrinks or contracts about the pipe section undergoing a substantially greater degree of contraction so as to form an extremely tightly bonded skin about the pipe section 104. It should be noted, however, that since the elongation characteristic of the polyethylene material is at the range of 600% even though it has undergone substantial contraction, no stretch cracks whatsoever will develop in the polyethylene coating.

The cooling operation is continued until the polyethylene material has its temperature level fall below the softening point of the polyethylene material. The softening point temperature level varies with the polyethylene materials utilized and in one exemplary embodiment utilizing powdered "Microthene," the softening point of this material is approximately 140° F. so that the coolant is introduced into the pipe section for a period sufficient to permit the pipe coating temperature level to fall below 140° F. As soon as this softening point temperature is achieved and passed, the cooling operation is automatically terminated by the timing means 255 which actuates the electrically operated valve means 200 to cut-off the flow of water falling through outlet tube 197.

The loading means hydraulic jack 215 is then automatically operated by the loader timing means 256 to eject the finished pipe section 104 in the manner previously described. The operation of the loading means hydraulic jack 215 thereby feeds the next pipe section, such as, for example, the pipe section 104a of FIGURE 1, upon the roller cooperating pairs 181–183 and 182–184 acting further to bump the finished pipe section 104 off the cooperating roller members and on to the guide rail members 106. The cooling operation has cooled the pipe section sufficiently to permit it to be manually handled immediately upon being fed through guide rails 106. In addition thereto, there is no need for drying or curing each finished pipe section as it leaves the pipe coating apparatus 150 and thereby each finished pipe section is immediately available for field installation.

It should be understood that the pipe coating assembly described here and above constitutes only one exemplary embodiment for carrying out the novel method of the instant invention and a variety of other machines or mechanisms may be employed to perform the method. As one example, one possible alternative consists of preheating each pipe section prior to the positioning of the pipe section beneath the hopper means and then after each pipe section is preheated or baked to the required temperature level, the pipe section may then undergo the coating operation. In cases where it is desired to coat pipe sections of substantial lengths, such as, for example, 40 or 60 foot lengths, the dead weights of each pipe section so treated may be such as to cause the pipe section to bellow towards the center thereof. One possible arrangement for dealing with such sagging is to provide a freely rotating roller member 241 pivoted to rotate about the tube member 205. It is not necessary that this roller member 241 rotate since the end rollers 181 and 182 are sufficient to drive the pipe section into rotation about its longitudinal axis. Cooperating with the roller means 241 is the second roller means 242, supported and pivoted by suitable brackets 243 positioned relative to the roller 241 in much the same manner as the cooperating roller pairs 181–183 and 182–184. The roller members 241 and 242 may be made extremely thin so as to prevent any collection of powdered Microthene material upon their peripheral edges. As another alternative, their peripheral edges may be coated with a material of an extremely low coefficient of friction, such as, for example, material sold under trademark name "Teflon." Positioning of the rollers 241 and 242, as shown in FIGURE 5, helps to completely alleviate any sagging of pipe sections treated by the pipe coating apparatus.

As far as pipe diameters are concerned, the pipe coating apparatus, shown in the FIGURES 1–7 is suitable to coat pipe sections of any diameters presently in use and the height of the hopper means need only be suitably adjusted so as to be appropriately positioned over any pipe section to be treated. In addition thereto, each pipe section treated need not have a perfectly smooth outer surface, but may be uneven and this in no way will affect the coating imparted to the surface of the pipe. It is also possible to coat pipe setcions having a polygonal cross-section, such as, for example, an octagonal cross-section, with the same degree of success as that obtained in treating pipe having circular cross-sections. It should be understood, however, that the cross-section of the pipe should lend itself to the rotation of the pipe on suitable rotation imparting means, such as the exemplary rotation imparting means comprised of the motor driven rollers 181 and 182 shown in the figures.

It will be noted that the rollers 181 and 182 and the cooperating rollers 183 and 184 are positioned so that they lie at the extreme ends of the pipe section being coated so as to permit coating of the pipe along substantially its entire length with the exception of approximately two inches of pipe at each end thereof. This can best be seen in FIGURE 5, which shows the extreme right-hand end of the pipe for a distance of approximately two inches as being uncoated. In field installations, pipe sections of the type described herein are usually placed end to end and welded to one another. It has been noted that the welding operation will in no way affect the polyethylene coating upon the pipe with the coating being only two inches away since a sufficient amount of heat is dissipated over that length of pipe so as to prevent noticeable harm to the pipe coating provided on each pipe section. This is a decided advantage over present day pipe coating methods when the coatings in close proximity to the welded joints are placed in severe danger of being damaged, due to the welding operation. In order to prevent the fusion or sticking of the powdered polyethylene material to the cooperating roller means 181–183 and 182–184, it is also possible to treat their peripheral surfaces with a suitable material having a low coefficient of friction, such as, for example, the Teflon material mentioned previously.

The powdered polyethylene material employed in the pipe coating operation is not limited to the polyethylene material sold under the trademark name Microthene, but may be of any other suitable powdered polyethylene material. The shape or configuration of each particle of ground polyethylene material is not critical so long as the fineness of the material is sufficient to pass through a screen of approximately 40 mesh. It has been found that upon completion of the pipe coating operation, by utilizing a suitable measuring instrument, the thickness of the protective coating provided on pipe section has been substantially identical to that desired by selecting the appropriate temperature level of the heated pipe sections and by controlling the vibration cycle of the hopper means. Further, the coating has had an extremely uniform thickness throughout the entire length and over the entire surface of each pipe section so treated.

It can therefore be seen that the instant invention teaches a novel method for providing a protective coating on the surface of pipes and the like which has excellent properties for the prevention of corrosion or contamination to the pipes which is shown to be extremely rugged and durable to guarantee an extremely long, useful, operating life for each pipe section so treated.

The illustrated embodiment shows an arrangement of the hopper 60 and its associated parts stationary with respect to the pipe being coated. However, it will be apparent to those skilled in the art that in the event the length of the pipe will not permit the hopper length to encompass the entire length of the pipe, the hopper 60 and its associated parts could be made movable. In the event it is desired to coat a pipe of substantial length, as for example 50 ft., the hopper could be moved in discrete steps parallel to the axis of the pipe. All discrete movements of the hopper, for the purpose of coating the pipe with polyethylene material, would be completed before the remaining steps of cooling and softening take place.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A method for coating the exterior surfaces of pipe sections and the like comprising the steps of maintaining the pipe to be treated in a stationary position so that it experiences no linear movement; rotating the pipe about its longitudinal axis; providing an elongated flame positioned along the length of the pipe to heat the pipe as it rotates; heating the pipe to be treated to a predetermined temperature level above the fusion point of a polyethylene material; applying a powered polyethylene material, maintained substantially at room temperature and being of a fineness sufficient to pass through a screen in the range of 10 to 50 mesh, by dropping by gravity upon the exterior surface of the heated pipe and over the entire length to permit substantially instantaneous fusion of the powdered polyethylene upon the surface of the pipe; said powder being dropped along a substantially straight line above the rotating pipe so as to drop by gravity upon the rotating surface of the pipe; and cooling the pipe with a liquid coolant in such a manner as to cool first the pipe and then the polyethylene coating on the pipe surface; said cooling being performed by tilting the pipe to raise one end thereof and introducing a coolant into the raised end of said pipe to cause the coolant to flow along the interior and removing said coolant at the lower end of said pipe.

2. The method of claim 1 wherein the step of rotating the pipe further includes the step of simultaneously vibrating the rotating pipe to enhance the uniform smoothing of the fused polyethylene coating on the outer surface of the heated pipe.

3. The method of claim 1 which further includes the step of maintaining the rotation of the heated piped uring the cooling step to cause the liquid coolant to make physical contact with the entire inner surface of the pipe as it completes each revolution.

4. The method of claim 1 wherein the step of rotating the pipe includes controlling the rotation to lie in the range from 15 to 25 r.p.m.

5. The method of claim 1 wherein the step of dropping the powdered polyethylene upon the surface of the heated pipe is controlled to be of a time duration in the range of 5 to 20 seconds.

References Cited

UNITED STATES PATENTS

| | | | |
|---|---|---|---|
| 2,133,516 | 9/1936 | Huebner | 118—320 |
| 2,838,023 | 6/1958 | Jaime | 118—57 |
| 3,016,875 | 1/1962 | Ballentine et al. | 117—18 X |
| 3,044,893 | 7/1962 | Heintz et al. | 118—320 |
| 3,108,022 | 10/1963 | Church | 118—58 |
| 3,106,481 | 10/1963 | Sorg | 117—119.2 X |
| 3,116,166 | 12/1963 | Halley | 118—69 |
| 3,161,530 | 12/1964 | Strobel | 117—18 |
| 3,208,869 | 9/1965 | Starr et al. | 117—18 |
| 3,230,105 | 1/1966 | Spraul et al. | 117—18 |
| 3,217,405 | 11/1965 | Das. | |
| 3,260,611 | 7/1966 | Weidenhammer | 118—57 |

FOREIGN PATENTS 1,129,092  5/1962  Germany.
115,735  11/1876  France.

WILLIAM D. MARTIN, *Primary Examiner.*

P. F. ATTAGUILE, *Assistant Examiner.*